Feb. 23, 1932. J. M. BING 1,846,382
CAMERA TRIPOD CLUTCH
Filed June 22, 1929
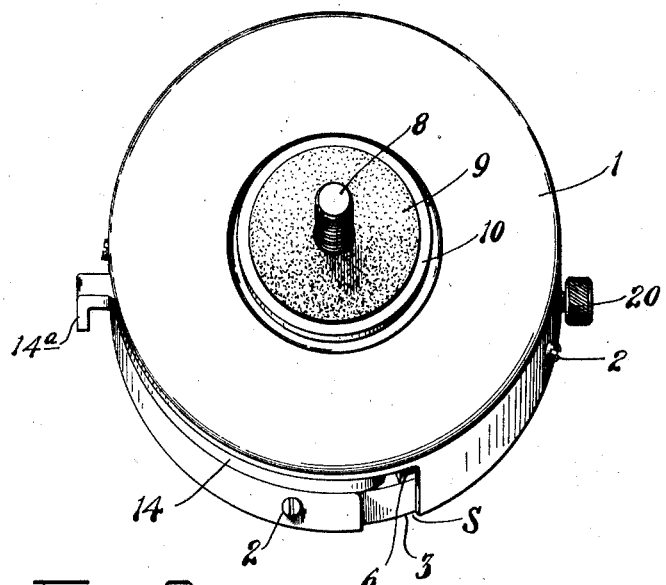
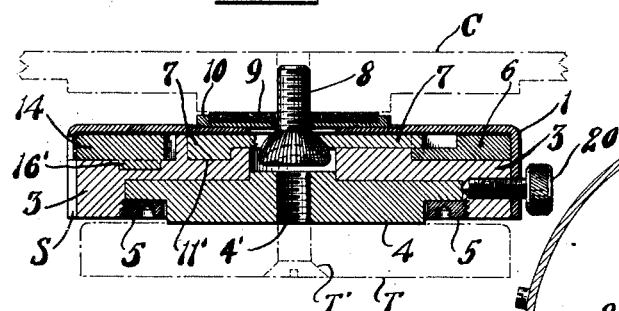
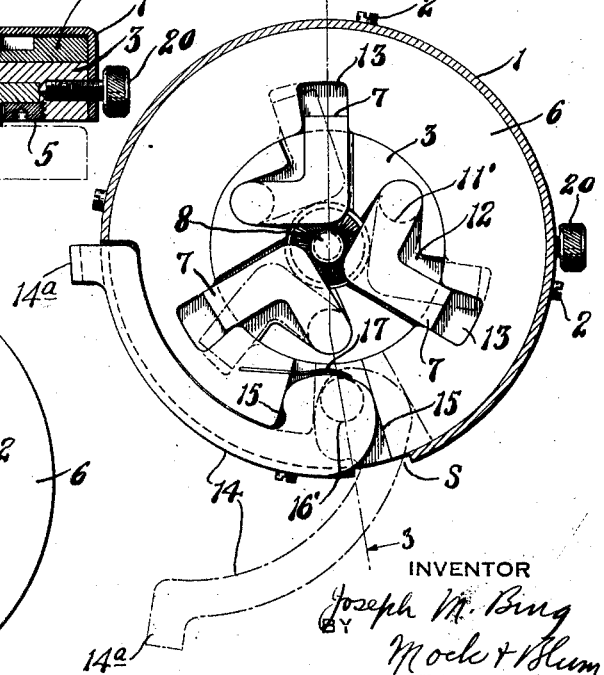
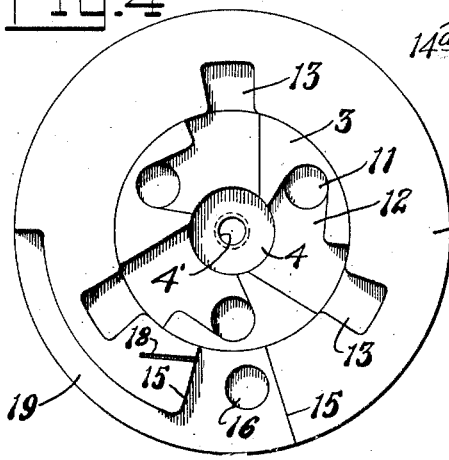
INVENTOR
Joseph M. Bing
BY Mock & Blum
ATTORNEYS Patented Feb. 23, 1932

1,846,382

UNITED STATES PATENT OFFICE

JOSEPH M. BING, OF NEW YORK, N. Y., ASSIGNOR TO DREM PRODUCTS CORPORATION, OF NEW YORK, N. Y.

CAMERA TRIPOD-CLUTCH

Application filed June 22, 1929. Serial No. 372,878.

My invention relates to a new and improved camera tripod-clutch.

One of the objects of my invention is to provide a device by means of which a camera will be firmly but detachably connected to a camera tripod.

Another object of my invention is to provide a clutch of this type in which the camera can be adjusted around a vertical axis without separating it from the tripod, and in which clamping means are provided to hold the camera pointing in any desired direction.

Another object of my invention is to provide a device of this type by means of which the camera will be firmly forced against the clutch so that it is firmly and frictionally held in position.

Another object of my invention is to provide a device in which the clutch members will operate against the tapered head of a screw or other device which is connected to the camera, and in which it shall not be necessary to have the cooperating parts accurately and correspondingly shaped.

Another object of my invention is to provide a device in which a member connected to the camera is engaged at a plurality of points, and preferably at not less than three points so as to provide a very firm and efficient connection.

Another object of my invention is to provide a device by means of which a member connected to the camera is engaged by a plurality of radially movable levers.

Another object of my invention is to provide a simple and compact device which can be readily manufactured and assembled or taken apart.

Other objects of my invention will be set forth in the following description and drawings which illustrate a preferred embodiment thereof, it being understood that the above general statement of the objects of my invention is intended merely to generally explain the same and not to limit it in any manner.

Fig. 1 is a perspective view.

Fig. 2 is a plan view with the top or cover removed.

Fig. 3 is a sectional view on the line 3—3 of Fig. 2.

Fig. 4 is a plan view of the plates which shows the relative positions of the means for mounting the levers.

The device consists of a series of plates of circular contour located in a cover or casing 1. The tripod T is provided with a tripod screw T' which enters the internally threaded recess 4' of the plate 4 so that the plate 4 is immovably clamped to the tripod. The plate 4 has an upper portion of annular contour which interfits with the correspondingly shaped adjacent surface of intermediate plate 3. Hence, when the plates 3 and 4 are assembled in the position shown in Fig. 3, the plate 3 can turn with respect to plate 4, but the plate 3 cannot shift in a lateral or radial direction with respect to plate 4. In effect, the plate constitutes a bearing plate for the intermediate turnable plate 3.

Plate 3 is turnably held on plate 4 by means of the externally threaded ring 5, provided with suitable recesses as shown in Fig. 3, so that a tool can be applied to the ring 5, in order to connect it to plate 3. As shown in Fig. 3, the bottom of the inner wall of the ring 3 is threaded, so as to cooperate with the threading of the retaining ring 5. The retaining ring 5 prevents any movement of the plate 3 with respect to the bearing plate 4 in the vertical or axial direction. The turnable plate 3 is provided with a clamping screw 20 located in a threaded recess of said plate 3, so that it can be held in any adjusted position. The cover or casing 1 is connected to the turnable plate 3 by means of clamping screws 2 which are located in threaded openings in said cover, so that the cover 1 turns in unison with the plate 3. The plate 3 supports an operating ring 6. As will be later more fully explained, this ring 6 can be turned relative to the ring 3 by means of lever 14, so as to actuate the locking levers 7 to their operative position.

The lever 14 has an enlarged inner cam-shaped head which fits within a recess in the ring or plate 6. Said recesses has the radially directed walls 15. The inner head of the lever 14 is also provided with a boss 16' which fits within a recess 16 in the plate 3. Hence the lever 14 can be turned on its boss 16', which serve as a pivot. When the lever 14 is turned from the full line position indicated in Fig. 2 to the dotted line position shown in Fig. 2, then the effect of the cam shape of the inner head of the lever 14 is to turn the ring 6 with respect to the plate 3. When the lever 14 is turned in the counter-clockwise direction to the dotted line position indicated in Fig. 2, the operating ring 6 is also turned in the counter-clockwise direction so that the locking levers are moved to their inoperative position. When the lever 14 is turned to the full line position indicated in Fig. 2, the ring 6 is turned in the clockwise direction to the full line position indicated in Fig. 2 so that the locking levers 7 are turned to the operative position indicated in full lines in Figs. 2 and 3.

As shown in Fig. 2, the ring 6 is provided with a series of recesses 13, three of such recesses being shown in this embodiment. The outer ends of clamping levers 7 move in said recesses 13. Said clamping levers 7 have pins or bosses 11' which fit in recesses 11 of plate 3.

Hence, when the lever 14 is moved to the full line position shown in Fig. 2, the plate 6 is turned in the clockwise direction so as to cause the elbows of the clamping levers 7 to approach each other and to clamp the tapered head of the camera screw 8 of the camera C, so that said tapered head is forced downwardly and the camera C is forced powerfully against the friction washers 9 made of leather which are held in the ring 10 mounted on cover 1. The head of the screw 8 is knurled. Due to the contour of the inner head of the lever 14, it is self-locking when it is in the full line position shown in Fig. 2. However, in order to take care of any wear of the parts, a plate spring 17 is mounted in a slot 18 of the ring 6 so that the lever 14 is urged to the operative or full line position or is at least prevented from moving from this full line position, unless the lever 14 is moved by the operator. The cover 1 is provided with a slot S so that the lever 14 can be moved to the dotted line position in order to enable the parts to be assembled. The ring 6 is provided with a peripheral recess 19 to accommodate the lever 14 in its full-line or operative position. Hence when the lever 14 is moved to the full line position, it lies wholly within the casing or cover 1, save for its projecting head 14a which can be conveniently operated by the fingers of the operator.

After the levers 7 are in their clamping position, it is merely necessary to loosen the screw 20 to turn the ring 3, cover 1 and camera C so that the camera C points in any desired position.

It is particularly advantageous to clamp the camera screw 8 at not less than three points which are symmetrically disposed with respect to the vertical axis of said camera screw 8, because this three-point connection prevents any shifting of the camera screw. Likewise, the device operates, not only to clamp the tapered head of the camera screw at three symmetrically disposed points, but also to exert a powerful downward force upon the tapered head of the screw 8 at these points. Since this downward force is exerted at not less than three points, it is impossible for the camera screw to move save in the downward direction, and the camera screw 8 is moved downwardly for a short distance until the washers 9 are compressed to provide a very powerful frictional grip between the camera C and the device, without causing the camera C to be even slightly tilted in an angle to the vertical direction. While I prefer to use a separate camera screw 8, I do not limit my invention thereto as the downward clamping forces produced by the levers 7 could be exerted upon any suitable member which need not necessarily be separate from the camera C.

Likewise, while I have shown certain details of construction, my invention is not to be limited thereto as I broadly claim that I am the first to clamp a camera to a turnable support by means of three or more downwardly directed and symmetrically disposed forces.

While I have shown the device held with its axis in a vertical position, and I have so described it for convenience, it is obvious that the tripod might be held at any desired angle so that when I specify the vertical direction either in the description or in the claims, it is to be understood that I cover the device disclosed herein if its axis is held at any inclination to the vertical direction.

Likewise, while I prefer to have the locking means 7 effective to exert a downward force upon the camera screw 8, my invention is not necessarily limited to this feature.

In general, while I have shown a preferred embodiment of my invention, it is clear that numerous changes and omissions can be made without departing from the spirit of my invention.

For example, it is particularly advantageous to have the head of the camera screw 8 of semi-spherical shape or of frustro conical shape. The locking levers have their greatest efficiency when they move parallel to the base of a hemisphere.

I claim:

1. A camera support comprising a base ring, an intermediate ring turnably mounted thereon, an upper ring mounted on said turnable ring and turnable with respect thereto, a cover member connected to said intermediate ring so as to turn in unison therewith, means adapted to turn said upper ring with respect to said turnable ring, and locking means adapted to lock the camera to said cover by the movement of said upper ring relative to said intermediate turnable ring.

2. A camera support comprising a base ring, an intermediate ring turnably mounted thereon, an upper ring mounted on said turnable ring and turnable with respect thereto, a cover member connected to said intermediate ring so as to turn in unison therewith, means adapted to turn said upper ring with respect to said turnable ring, and locking means adapted to lock the camera to said cover by the movement of said upper ring relative to said intermediate turnable ring, and clamping means adapted to revolubly clamp the intermediate turnable ring to the base ring.

3. A camera clutch comprising a casing provided with a peripheral wall having a slot therein, a lever pivoted within said casing and adapted to occupy said slot when it is in the operative position, and locking means located within said casing and connected to said lever, said locking means being moved to their operative position to lock a camera to said casing when said lever is moved to occupy said slot in the wall of the casing, so that said lever is then substantially located within said casing.

4. A clutch device for a camera comprising a base ring having an intermediate ring turnably mounted thereon, a top ring turnably mounted on said intermediate turnable ring, a cover mounted on said top ring and connected to said intermediate turnable ring so as to turn in unison therewith, said top ring having radially directed recesses therein, clamping levers pivotally mounted in said intermediate turnable ring and having ends located within said recesses so that said clamping levers are actuated when the top turnable ring is turned with respect to the intermediate turnable ring, and a lever pivotally connected to said intermediate turnable ring, said lever being adapted to turn said top ring with respect to said intermediate turnable ring so as to actuated said locking levers.

5. A clutch device for a camera comprising a base ring having an intermediate ring turnably mounted thereon, a top ring turnably mounted on said intermediate turnable ring, a cover mounted on said top ring and connected to said intermediate turnable ring so as to turn in unison therewith, said top ring having radially directed recesses therein, clamping levers pivotally mounted in said intermediate turnable ring and having ends located within said recesses so that said clamping levers are actuated when the top turnable ring is turned with respect to the intermediate turnable ring, a lever pivotally connected to said intermediate turnable ring, said lever being adapted to turn said top ring with respect to said intermediate turnable ring so as to actuate said locking levers, and said lever having an inner cam head which bears against the walls of an additional recess in said top ring.

6. A clutch device for a camera comprising a base ring having an intermediate ring turnably mounted thereon, a top ring turnably mounted on said intermediate turnable ring, a cover mounted on said top ring and connected to said intermediate turnable ring so as to turn in unison therewith, said top ring having radially directed recesses therein, clamping levers pivotally mounted in said intermediate turnable ring and having ends located within said recesses so that said clamping levers are actuated when the top turnable ring is turned with respect to the intermediate turnable ring, a lever pivotally connected to said intermediate turnable ring, said lever being adapted to turn said top ring with respect to said intermediate turnable ring so as to actuate said locking levers, said cover and said intermediate turnable ring having slots to permit the outward movement of said lever with respect to said cover and to permit the movement of said lever within said cover.

In testimony whereof I affix my signature.

JOSEPH M. BING.